United States Patent Office 2,973,938
Patented Mar. 7, 1961

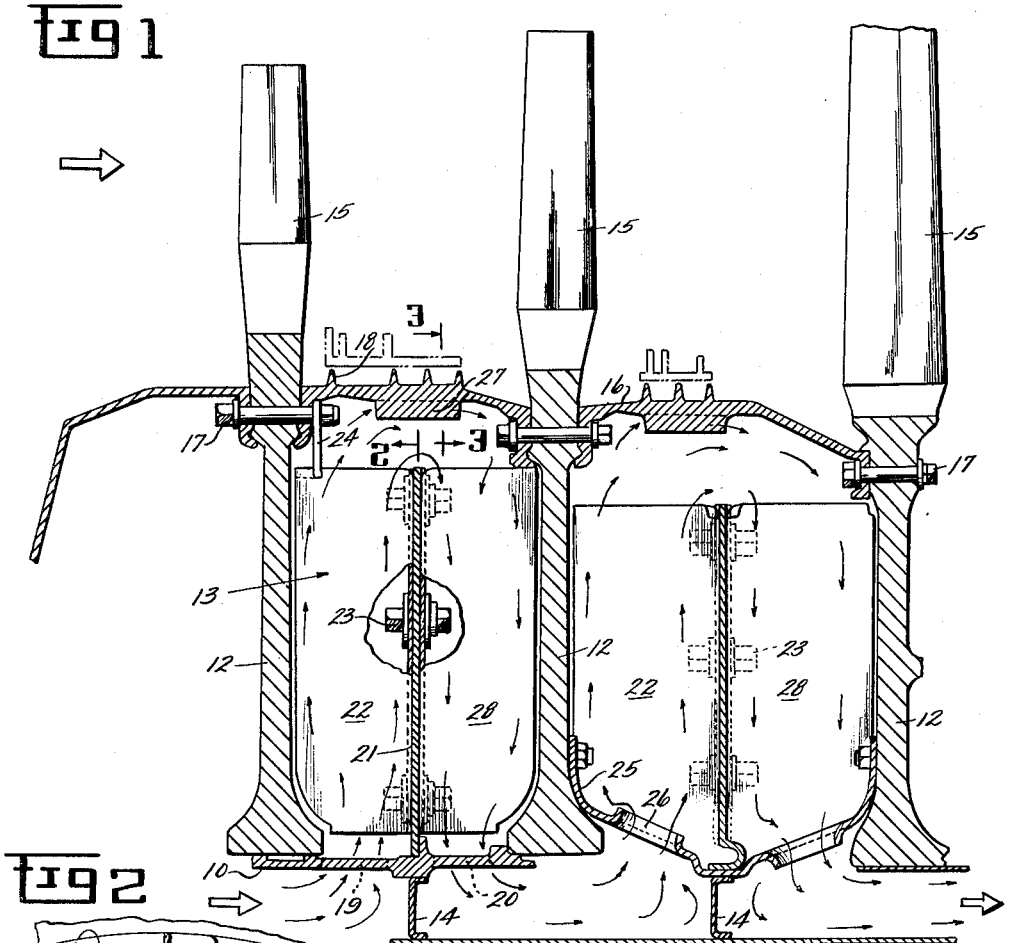
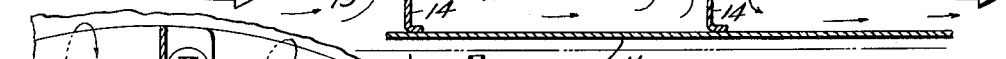
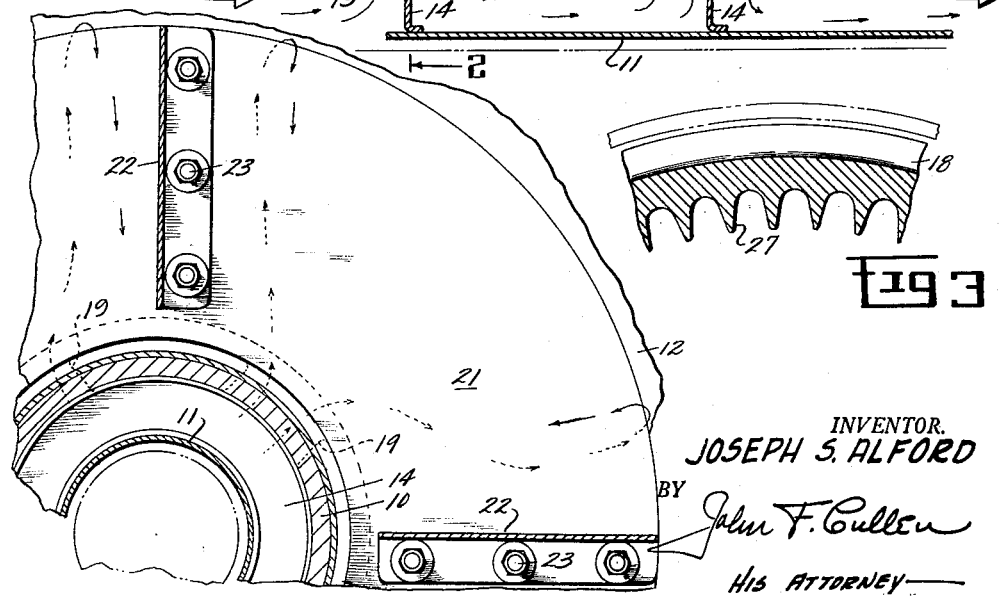

2,973,938

COOLING MEANS FOR A MULTI-STAGE TURBINE

Joseph S. Alford, Cincinnati, Ohio, assignor to General Electric Company, a corporation of New York Continuation of application Ser. No. 557,725, Jan. 6, 1956. This application Aug. 18, 1958, Ser. No. 756,062

6 Claims. (Cl. 253—39.15)

The present invention relates to improvements in cooling means for rotating parts and, more particularly, to an arrangement of parts to effectively cool the disk wheels and spacer bands in a multi-stage turbine such as may be used in aircraft jet engine power plants and is a continuation of application Serial Number 557,725, now abandoned.

When a heated surface is exposed to colder air, the density of the air near the heated surface is less than that of the main body of the air. The difference in density causes a buoyant force on the heated air, which causes the heated and less dense air to move away in a direction opposite to the gravitational acceleration. This buoyant force causing the motion is proportional to the acceleration of the air. The heat is conducted through gas layers and is carried away by bulk motion or convection. This phenomenon is called natural convection.

Under certain conditions, natural convection will not take place. The heated air will rise only as long as its density is less than the density of the surrounding air and, when they are the same, a state of equilibrium is reached and no further movement or convection will result. A practical example of insufficient natural or free convection may be found in the atmospheric conditions over certain western cities which are plagued by the smog problem. It is known that the altitude and the air temperature gradients have a relation on the free convection of air.

A similar problem can be encountered in the cooling of rotational machinery wherein the natural or free convection of air is insufficient or lacking so that the desired cooling cannot be obtained. For example, if two axially spaced disks are mounted on a rotating shaft-like member or its equivalent assembly and cooling air is introduced through the shaft and between the disks, natural convection will take place radially outwardly to cool the disks. If the periphery of the disks is heated by some external means, then the ability for free convection to take place depends upon the temperature difference between the incoming air and the air at the rim of the disks and the radii at the same points. For a given radius ratio, which is the ratio of the inner radius of the disk to the outer radius of the disk, there is a critical temperature differential below which natural or free convection will not take place. In other words, the smaller the radius ratio, the greater is the temperature differential needed to obtain free convection. In rotating machinery where a large range of operating conditions is encountered and the cooling air is admitted at a small radius, it becomes impractical to rely only on natural convection for satisfactory cooling.

Accordingly, the main object of the present invention is to disclose an arrangement that greatly enhances the natural convection of cooling air in rotating machinery.

A further object is to disclose an arrangement wherein the gravitational field causing natural convection is increased many thousand fold to increase the cooling effect obtainable.

Another object is to disclose an arrangement for a multi-stage turbine of the type employing spacer bands interconnecting the turbine wheels whereby the spacer bands may be sufficiently cooled by employing means to increase the natural convection phenomenon many fold.

Briefly described, in accordance with one aspect of my invention, I provide vanes in a chamber defined by the turbine wheels and torque tube or spacer band of a multi-stage turbine. These vanes are designed to give the cooling air, which is normally passed radially outwardly through the chamber, a tangential velocity substantially equal to that of the hot turbine parts to be cooled. The high tangential velocity provides a very large radial acceleration of the cooling air to greatly enhance natural convection. Axially directed cooling fins preferably are provided on the inner peripheral surface of the spacer band to utilize this increased natural convection to best advantage. The provision for increased natural convection and axially directed cooling fins results in effective cooling over a wide range of cooling air temperatures and speed.

My invention will be better understood from the following description taken in connection with the accompanying drawing and its scope will be pointed out in the appended claims.

In the drawings:

Figure 1 is a partial cross-sectional view of a multi-stage turbine employing the present invention and showing two modifications of vane mountings;

Figure 2 is a partial cross-sectional view taken on the line 2—2 of Figure 1; and Figure 3 is a partial cross-sectional view taken on the line 3—3 of Figure 1.

Referring first to Figure 1, there is shown a multi-stage turbine comprising a tubular member 10 which is preferably hollow for the introduction of cooling air from a suitable source such as a compressor, not shown. Shaft 10 may have a plug assembly 11 therein to deflect cooling air as will hereinafter be described. Turbine disks or wheels 12 are concentric with and attached to shaft 10. The combination shown is a preferred form in a typical gas turbine engine, although it will be apparent that many equivalents of tube 10 and plug assembly 11 may be substituted to serve the purpose of directing cooling air flow. Wheels 12 are axially spaced along tube 10 in a conventional manner to define a chamber generally indicated at 13 therebetween. Plug assembly 11 is mounted within tube 10 for rotation therewith by strut or baffle members 14 that provide axial support and act as air directing members. Conventional turbine blades 15 may be secured to the outer periphery of wheels 12 by any suitable means well-known in the art. The lightweight rotor structure illustrated obtains its main support from the use of a torque tube or spacer band 16 which is secured to the adjacent wheels by suitable fastening means 17 substantially at the periphery of the wheels. This structure is a "hollow barrel" type of rotor. The spacer band lends rigidity to the structure as a whole and acts as a torque tube between wheels 12. In order to seal against the passage of hot gases from one turbine stage to the other, the outer periphery of spacer band 16 may be equipped with suitable labyrinth seal means 18 cooperating with a fixed static sealing means shown in phantom that may be carried by the stator casing.

The passage of air between the turbine wheels 12 and through chamber 13 is ensured by the provision of fluid passage means 19 and 20 which are on opposite sides of struts 14 so that cooling fluid, as indicated by the arrows, may be supplied by the compressor not shown and passed through passage 19, chamber 13 and passage 20 in tube 10.

Because of the proximity of spacer band 16 to the hot gases, the spacer band and adjacent parts must be adequately cooled for satisfactory operation. As previously explained, conditions may be reached where the temperature of the spacer band and the incoming air at passage 19 and the radii of these two points are such that natural convection or circulation will not take place. That is to say, that under certain operating conditions, there is a critical temperature differential between the spacer band and the incoming air which, for a given radius ratio, will not permit natural convection and thus circulation below this critical limit. Unfortunately, the operating conditions of a typical jet engine employing a multistage turbine of the instant type, are such that natural convection or circulation will frequently not take place resulting in inadequate cooling of the spacer band and associated parts on the outer periphery of the turbine wheels.

In accordance with the present invention, I have provided means to enhance the natural convection many thousand fold so that free circulation takes place under all normal conditions of operation to provide adequate cooling of the spacer band and its associated parts. In carrying this out, I provide a radially extending supporting disk member 21 within chamber 13, which disk is supported for rotation with tube 10 and, as shown, is parallel to wheels 12. In order to provide for the flow of cooling air around the disk, it is preferably a solid disk and is located intermediate the turbine wheel or between the fluid passages 19 and 20. The disk is intended to rotate at substantially the same speed as the turbine wheel 12 and its purpose is to give the incoming air a tangential velocity substantially equal to the hot turbine parts to be cooled. By virtue of the high tangential velocity, the air has a very large radial acceleration. As a result of this radial acceleration, the centrifugal force in representative turbines is between 12,000 to 20,000 times the acceleration of gravity. Analysis shows that the rate of heat transfer is approximately proportional to the one-third power of the gravitational acceleration. In the turbine cooling application proposed herein, the natural convection heat transfer coefficient is more than thirty times greater than the similar coefficient for a one g acceleration field.

In order to raise the angular velocity of the incoming air substantially equal to that of the turbine wheel with a minimum amount of slippage, I provide vanes 22 on the upstream or incoming air side of disk 21. Vanes 22 are preferably equally spaced in a radial direction around the disk 21 and, as shown, may comprise four in number and may be mounted at substantially right angles to disk 21. It will be apparent that a different number of vanes may be employed and their angular relation to disk 21 may be varied. These vanes extend into close proximity with wheels 12 to provide a small clearance therebetween and the vanes extend radially substantially the length of the disk, permitting a clearance between the inner end of vanes 22 and passage 19 and a substantially larger clearance between the outer end of the vanes and the spacer band 16. These vanes may be secured by any suitable means such as bolts 23 to disk 21. In order to assure a positive drive of vanes 22 at a speed substantially equal to that of the turbine wheel 12, I provide a link 24 connected to the outer end of the vane and fastening means 17.

The construction shown between the second and third stage turbine wheels is a modified vane support structure which is lighter in weight and dispenses with link 24. As shown, vanes 22 may be secured directly by any suitable means to wheels 12 by a spider 25 which then acts in the same capacity as tube 10 and the term shaft or tubular member is intended to cover such an assembly or equivalent arrangements. Spider 25 has fluid passage means 26 formed therein to serve as an inlet in a manner similar to passage means 19. In this construction also disc member 21 is carried by the tube-equivalent spider 25 so that disc 21 rotates with the rotating parts.

Incoming air is given an angular velocity by vanes 22 substantially equal to that of the turbine wheel 12, and very large centrifugal forces are produced. These forces may be in excess of 10,000 times the normal acceleration of gravity. As a consequence, natural convection cooling is very much increased particularly if the surfaces to be cooled are properly designed to utilize to best advantage the natural convection cooling in the extremely strong centrifugal field. Heat transfer surfaces in the form of substantially axial fins are so designed as to utilize this natural convection to best advantage. Thus, on the inner surface of spacer band 16, I provide a plurality of peripherally arranged substantially axially directed fins 27 as seen in Figures 1 and 3. Each fin, of course, has a chimney-like effect producing natural convection or rising of warm air which rising action, in the instant embodiment, is radially towards the center of rotation. The substantially axial direction of the ring of fins 27 ensures that they do not impede the flow of air which flows in an axial downstream direction through the annular clearance space between the inside of the spacer band and the rim of the turbine wheel.

Because of the clearances provided, some slippage will occur. The relative motion within the clearances between the wheels 12 and vanes 22 provides a scrubbing action which may be controlled by the number of vanes 22 that may be used. In other words, if the number of vanes used becomes infinite, all of the cooling will take place by the scrubbing action of the air. In the present invention, the cooling by scrubbing is relatively small and the large proportion of cooling occurs by the increased natural convection process described.

Because of the free vortex effect and resulting high velocity and high pressure drop on the downstream side of disk 21, it is desirable to provide additional vanes 28 that may be substantially the same as vanes 22 in form and number. Vanes 28 avoid the free vortex effect and remove substantially all the tangential velocity from the cooling air flow. By so doing, all of the work of originally bringing the air up to wheel speed is returned to the turbine in the form of work done on the vanes 28. An even more important advantage is that these radial vanes, located between disks 21 and the downstream turbine wheel 12, assure solid body rotation of the air, and thereby reduce the pressure drop of the air in flowing radially inward from the surface of the spacer band through fluid passage 20.

In operation, the incoming air passes through passage 19 and is picked up by vanes 22 which increase the angular velocity substantially equal to that of the turbine wheel 12 by the time the air reaches the radially outward end of vanes 22. Thus, the normal acceleration is increased to 10,000 times or more the normal acceleration of gravity, whereby the free convection of hot air from fins 27 is greatly increased. The air passes sequentially through the clearance space between the ends of vanes 22 and fins 27 and flows radially inwardly to pass out by way of passage means 20. During its passage between vanes 28 substantially all of the tangential velocity is removed and the pressure drop of the air, due to the free vortex effect that would occur in the absence of vanes 28, is considerably reduced to permit easy removal of the air through passage means 20. As shown in Figure 1, the disk, vane and fin arrangement is preferably duplicated in the space between the second and third stage turbine wheel. The operation is substantially the same although the configuration may vary slightly due to the different pressure conditions, and, as previously described, a modified form of mounting has been shown.

Thus, it can be seen that the combination of the rotating vanes produces a high acceleration field and greatly increased free convection which may be taken advantage of by the use of fins 27 to provide for rapid and efficient cooling under all conditions of operation.

While particular embodiments of the invention have been illustrated and described, it will be obvious to those skilled in the art that various changes and modifications may be made without departing from the invention, and it is intended to cover in the appended claims all such changes and modifications that come within the true spirit and scope of the invention.

What I claim as new and desire to secure by Letters Patent is:

1. Cooling means for rotating parts comprising, a rotatable assembly including spaced wheels, a spacer band interconnecting said wheels substantially at the periphery thereof for rotation of the assembly about the axis of the wheels, a radially extending supporting disk intermediate said wheels and connected for rotation therewith, the periphery of said disk being adjacent the spacer band to define an opening therebetween for the passage of cooling fluid, a plurality of radially directed vanes carried by said supporting disk on the downstream side thereof, means for introducing cooling fluid at the radially inner portion of said rotating disk on the upstream side of said supporting disk, and means for removing it from the opposite side of said supporting disk.

2. Cooling means for rotating parts comprising, a rotatable tubular member, spaced wheels attached to said tubular member for rotation therewith, a spacer band interconnecting said wheels substantially at the periphery thereof, a plurality of peripherally spaced substantial axially directed fins on the inner surface thereof, a radially extending supporting disk intermediate said wheels and connected for rotation therewith, the periphery of said disk being adjacent the spacer band to define an opening therebetween for the passage of cooling fluid, a plurality of radially directed vanes carried by said supporting disk on the downstream side thereof, means for introducing cooling fluid at the radially inner portion of said rotating disk on the upstream side of said supporting disk, and means for removing it from the opposite side of said supporting disk.

3. Cooling means for rotating parts comprising, a rotatable tubular member, axially spaced wheels attached to said tubular member for rotation therewith, a continuous spacer band interconnecting said wheels substantially at the periphery thereof, a plurality of peripherally spaced substantial axially directed fins on the inner surface of said band, a radially extending supporting disk intermediate said wheels and connected for rotation therewith, the periphery of said disk being adjacent the spacer band to define an opening therebetween for the passage of cooling fluid, a plurality of radially directed vanes carried by said disk on the downstream side thereof, said disk and vanes being spaced from the inner surface of said fins, means for introducing cooling fluid through said tubular member to the inner portion of said rotating disk on the upstream side of said disk, and means for removing it from the opposite side of said disk at the radially inner end thereof.

4. Cooling means for a multi-stage turbine comprising, a rotatable tubular member, at least two turbine wheels attached to said rotatable tubular member and axially spaced thereon to define a chamber therebetween, a closed spacer band interconnecting said wheels substantially at the periphery thereof, a plurality of peripherally spaced substantial axially directed fins on the inner surface of said band extending into said chamber, a radially extending disk intermediate said wheels and connected for rotation therewith, said disk extending radially from the center of rotation less than the radial distance of the inner surface of said fins to define a clearance therebetween, a plurality of radially directed vanes mounted on both sides of said disk at substantially right angles thereto, said vanes having a clearance with said wheels and extending radially less than the radial distance of the inner surface of said fins, fluid passage means for introducing cooling fluid through said tubular member at the inner ends of said rotating vanes on one side of said disk, and fluid passage means for directing said fluid from the other side of said disk through said shaft member.

5. Apparatus as described in claim 3 wherein said radially directed vanes are equally spaced on said supporting disk.

6. Cooling means for a multi-stage turbine comprising, a rotatable fluid conducting tubular member, a pair of turbine wheels attached to said tubular member for rotation therewith, said wheels being axially spaced on said tubular member to define a chamber therebetween, a closed spacer band interconnecting said wheels substantially at the periphery thereof, a ring of peripherally spaced axially directed fins on the inner surface of said band between said wheels, said fins extending radially into said chamber toward said shaft member, a solid disk carried by said tubular member intermediate said wheels and connected for rotation with said wheels, said disk being parallel to said wheels, a plurality of equally spaced radially directed vanes supported on said disk and extending substantially at right angles from both sides thereof, said disk and vanes being spaced radially from said fins to define a clearance therebetween, said vanes further extending substantially to the inner periphery of said disk, fluid passage means in said tubular member at the radially inner end of said vanes on both sides of said disk, and baffle means carried by said rotating parts to direct fluid sequentially through said passage means.

References Cited in the file of this patent

UNITED STATES PATENTS

| | | |
|---|---|---|
| 1,708,402 | Schilling | Apr. 9, 1929 |
| 1,887,717 | Kock | Nov. 15, 1932 |
| 2,369,795 | Planiol et al. | Feb. 20, 1945 |
| 2,393,963 | Berger | Feb. 5, 1946 |
| 2,407,164 | Kimball | Sept. 3, 1946 |
| 2,557,747 | Judson et al. | June 19, 1951 |
| 2,648,519 | Campini | Aug. 11, 1953 |
| 2,662,685 | Blanc | Dec. 15, 1953 |
| 2,692,724 | McLeod | Oct. 26, 1954 |
| 2,779,565 | Bruckmann | Jan. 29, 1957 |
| 2,783,613 | Von-Zborowski | Mar. 5, 1957 |
| 2,868,500 | Boulet | Jan. 13, 1959 |